(12) United States Patent
Noguchi et al.

(10) Patent No.: US 11,161,061 B2
(45) Date of Patent: Nov. 2, 2021

(54) TURBID MATTER SEPARATING APPARATUS, TURBID MATTER SEPARATING METHOD, AND TURBID MATTER SEPARATING SYSTEM

(71) Applicant: HITACHI, LTD., Tokyo (JP)

(72) Inventors: Toshimitsu Noguchi, Tokyo (JP); Takuya Kambayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 411 days.

(21) Appl. No.: 16/180,433

(22) Filed: Nov. 5, 2018

(65) Prior Publication Data

US 2019/0299129 A1 Oct. 3, 2019

(30) Foreign Application Priority Data

Mar. 29, 2018 (JP) ................. JP2018-63693

(51) Int. Cl.
| | |
|---|---|
| *B01D 21/32* | (2006.01) |
| *B01D 21/24* | (2006.01) |
| *B01D 21/01* | (2006.01) |
| *B01D 21/28* | (2006.01) |
| *B01D 21/30* | (2006.01) |

(52) U.S. Cl.
CPC .......... *B01D 21/245* (2013.01); *B01D 21/01* (2013.01); *B01D 21/2433* (2013.01); *B01D 21/2444* (2013.01); *B01D 21/283* (2013.01); *B01D 21/302* (2013.01); *B01D 21/32* (2013.01)

(58) Field of Classification Search
CPC ...... B01D 21/01; B01D 21/32; B01D 21/302; B01D 21/245
See application file for complete search history.

(56) References Cited

FOREIGN PATENT DOCUMENTS

| CN | 105621580 A | * | 6/2016 |
| CN | 206359345 U | * | 7/2017 |

(Continued)

OTHER PUBLICATIONS

Office Action for related Japanese Patent Application No. 2018-063693, dated Mar. 3, 2021; English translation provided (8 pages).

*Primary Examiner* — Walter D. Griffin
*Assistant Examiner* — Cameron J Allen
(74) *Attorney, Agent, or Firm* — Procopio, Cory, Hargreaves & Savitch LLP

(57) ABSTRACT

A turbid matter separating apparatus extracts turbid matter and a supernatant liquid separately from a suspension. The invention is directed to a turbid matter separating apparatus which includes a liquid container which includes a sediment discharge port and a supernatant liquid discharge port and is filled with a suspension containing turbid matter, a sediment valve which is provided in the sediment discharge port, a supernatant liquid valve which is provided in the supernatant liquid discharge port, an ultrasonic irradiator which irradiates the suspension filled in the liquid container with ultrasound, and a control unit which controls the sediment valve, the supernatant liquid valve, and the ultrasonic irradiator, the control unit being configured to control the sediment valve to discharge a sediment and controls a supernatant liquid valve to discharge a supernatant liquid after a predetermined time elapses since the irradiation with ultrasound by the ultrasonic irradiator is stopped.

11 Claims, 13 Drawing Sheets

(56) References Cited

FOREIGN PATENT DOCUMENTS

| | | |
|---|---|---|
| GB | 2052468 A1 | 1/1981 |
| JP | S51-71665 U | 6/1976 |
| JP | S55-149610 A | 11/1980 |
| JP | H06-186397 A | 7/1994 |
| JP | 2015-100719 A | 6/2015 |
| WO | 2016/042832 A1 | 7/2017 |

* cited by examiner

[FIG. 1]
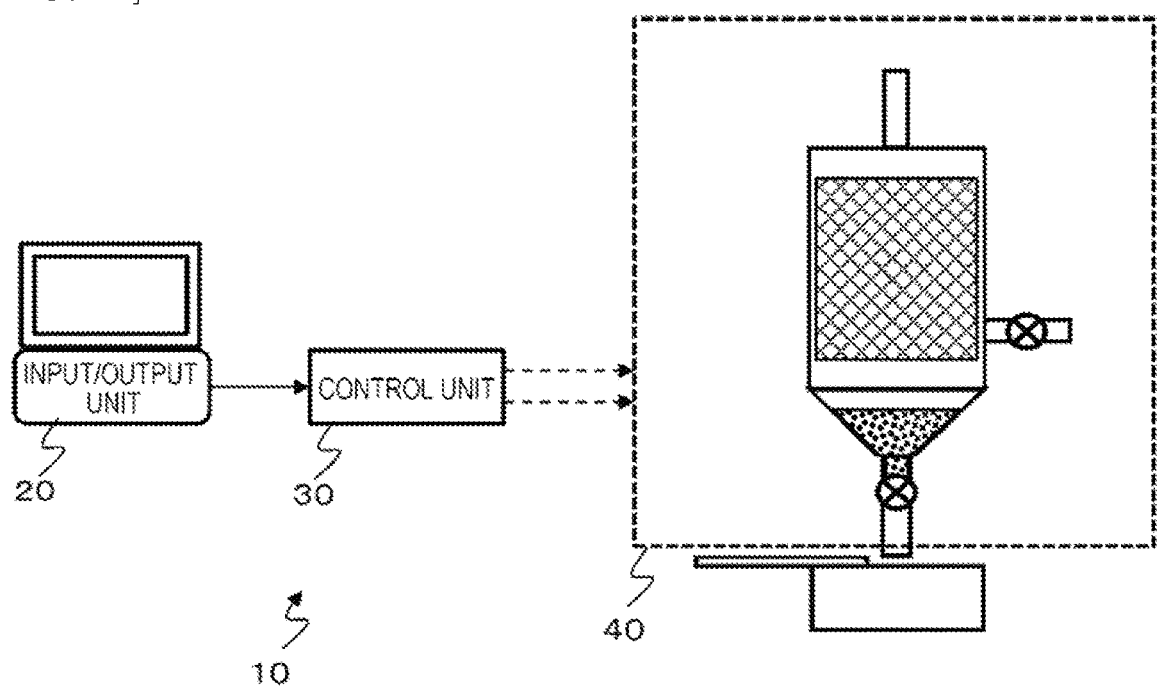

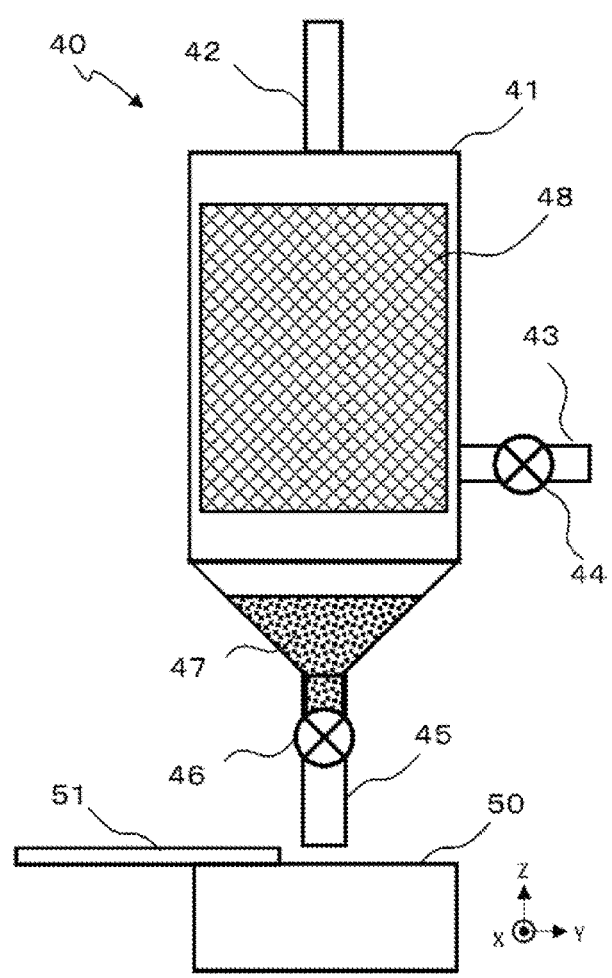
[FIG 2A]
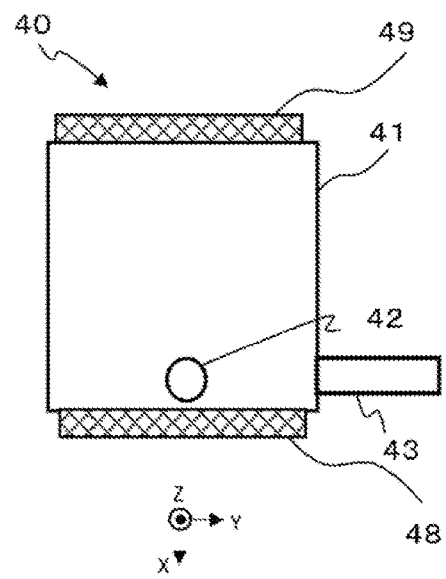
[FIG 2B]

[FIG. 3]
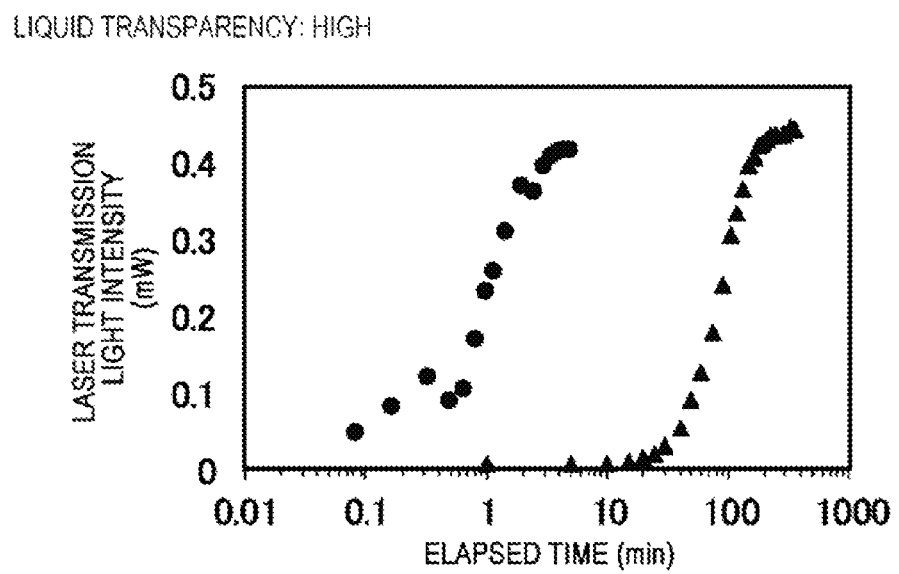

[FIG. 4]
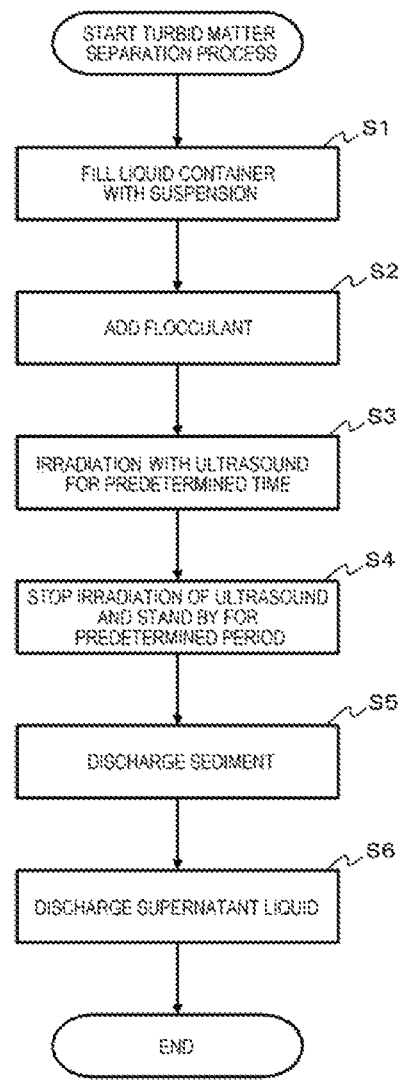

[FIG. 5]
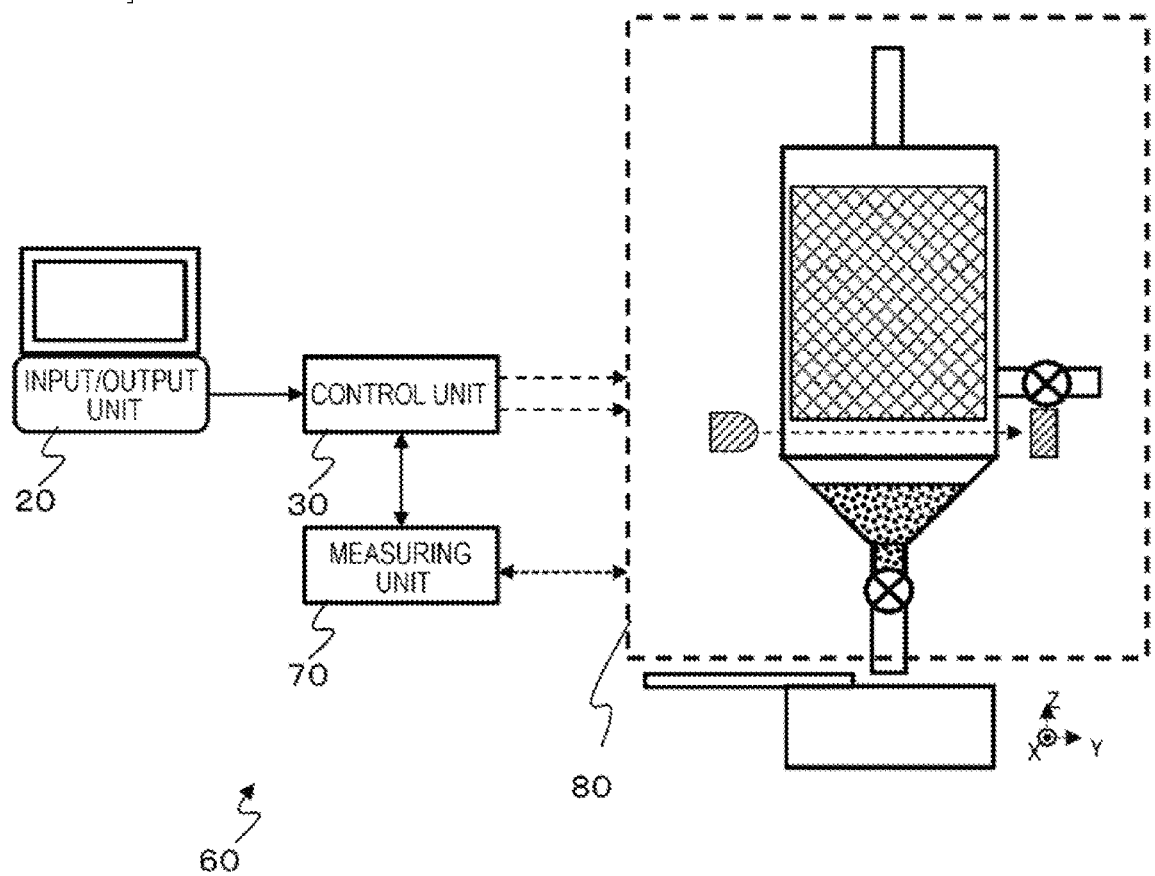

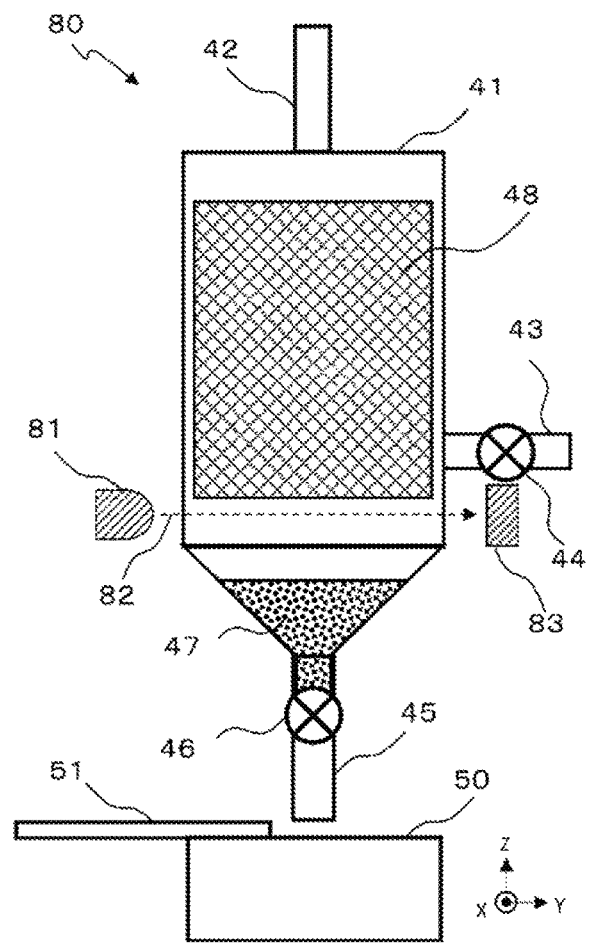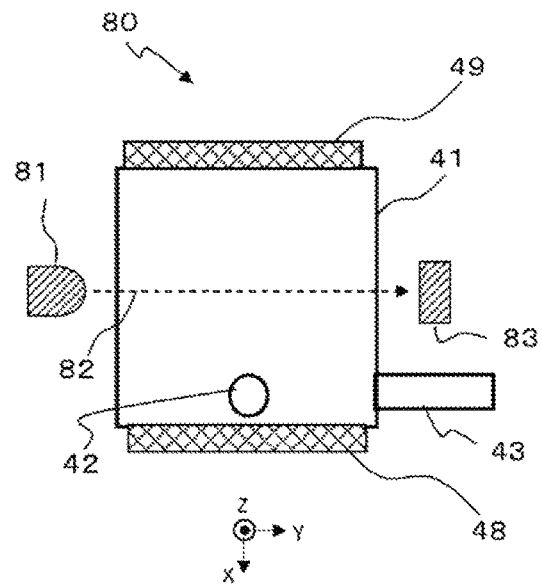
[FIG 6A]  [FIG 6B]

[FIG. 7]
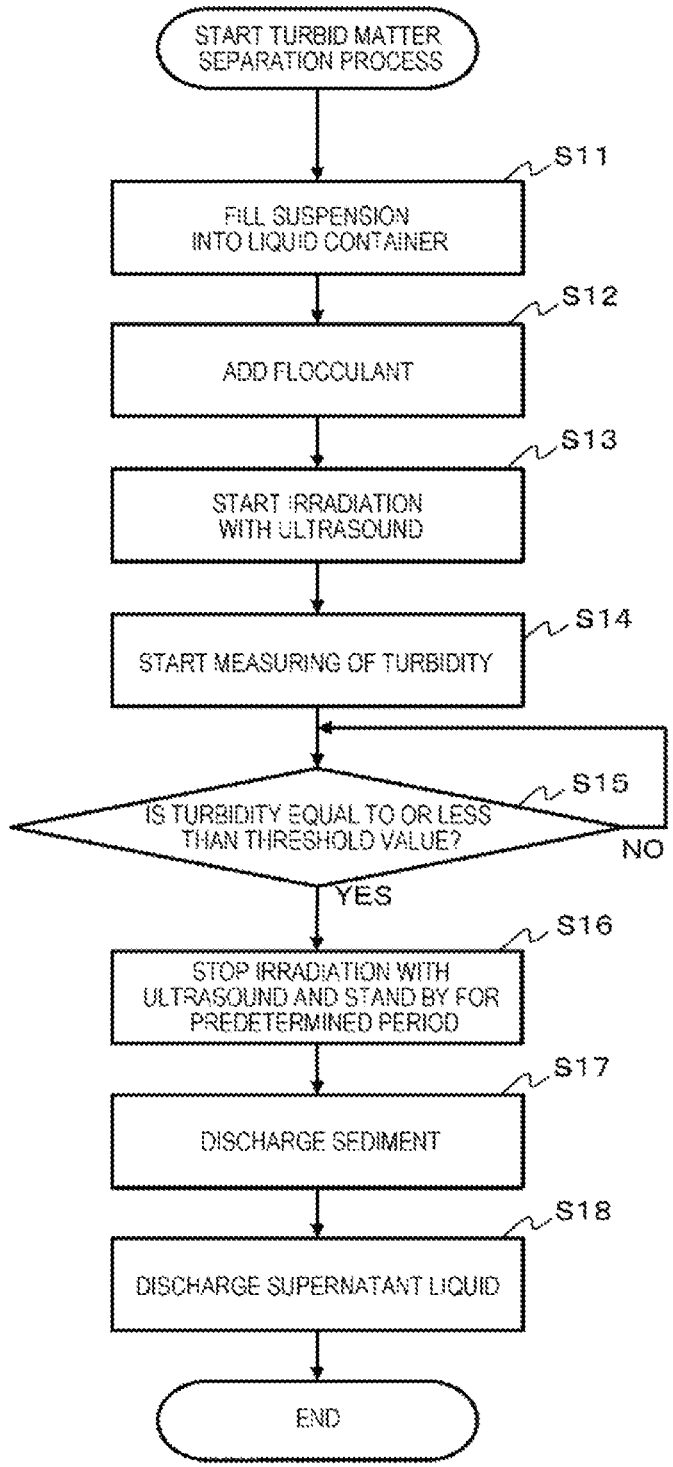

[FIG. 8]
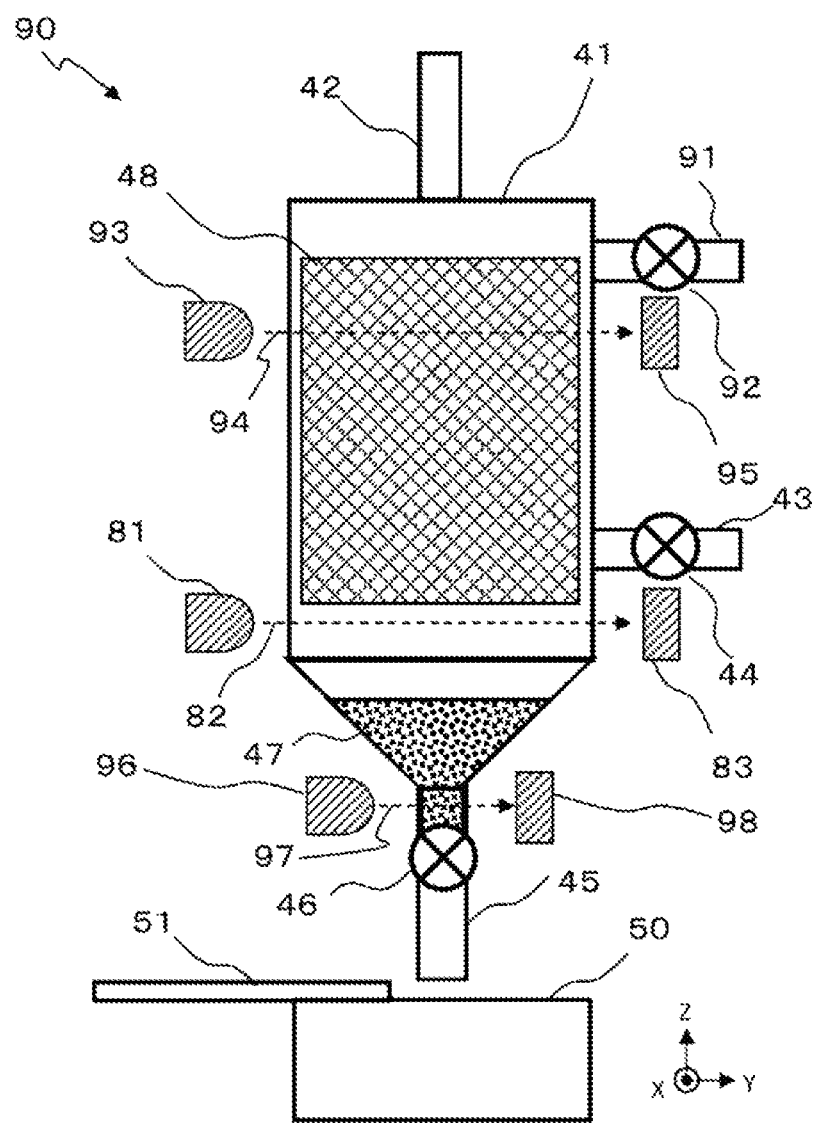

[FIG. 9]
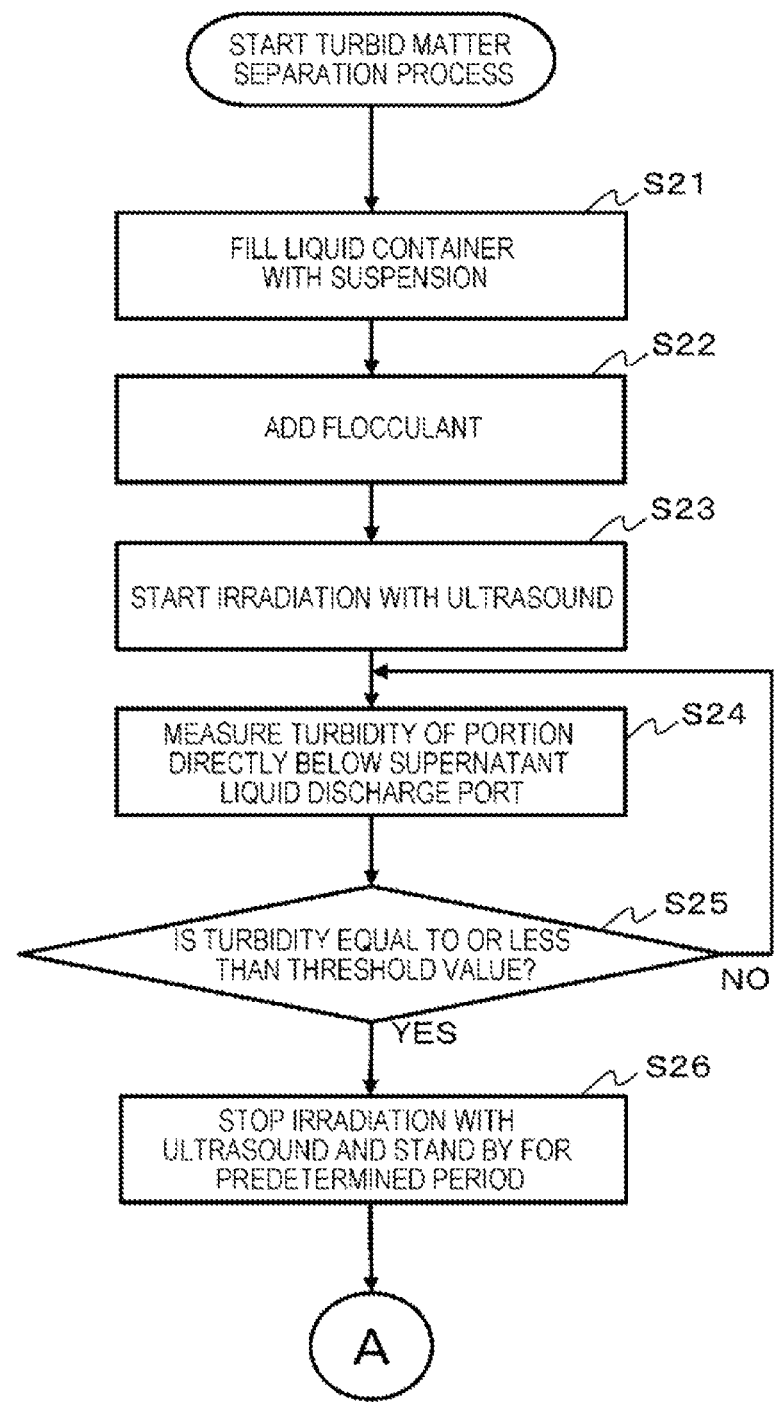

[FIG. 10]
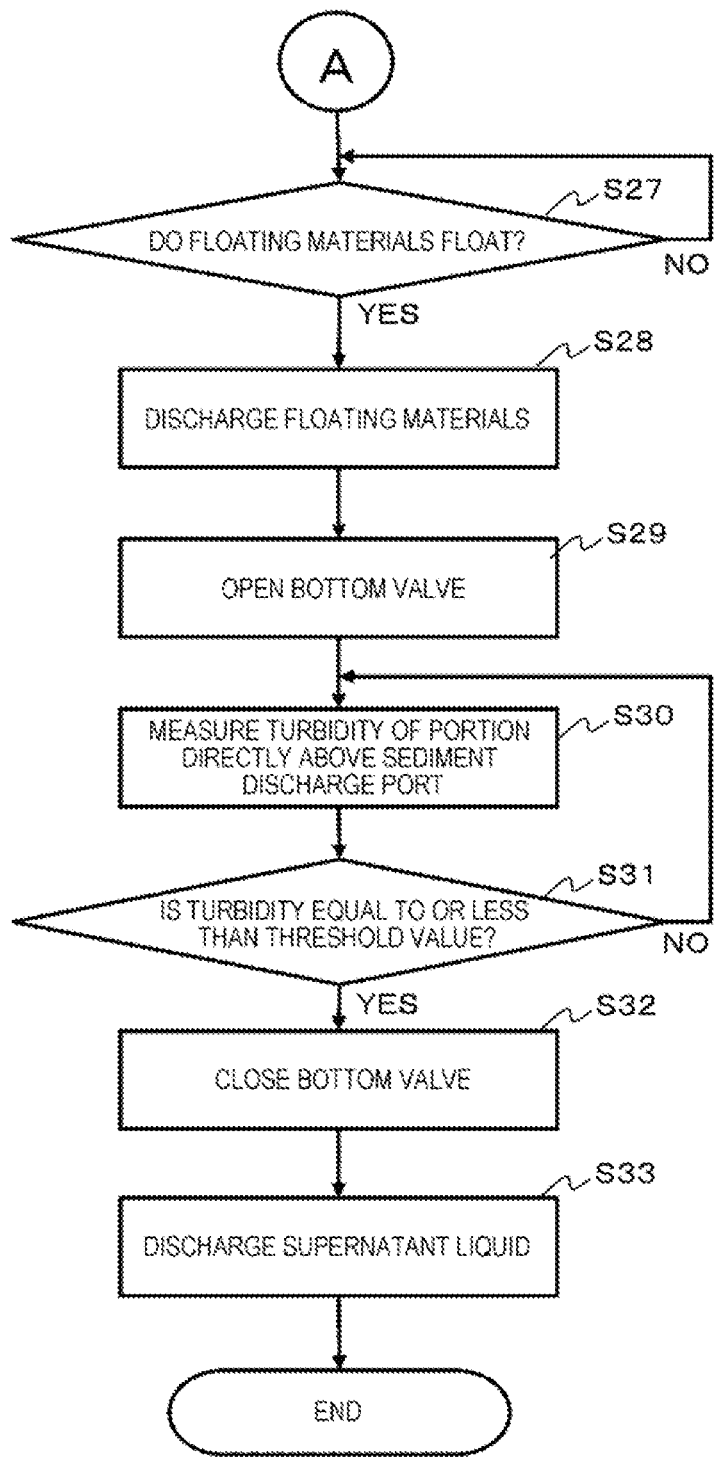

[FIG. 11]
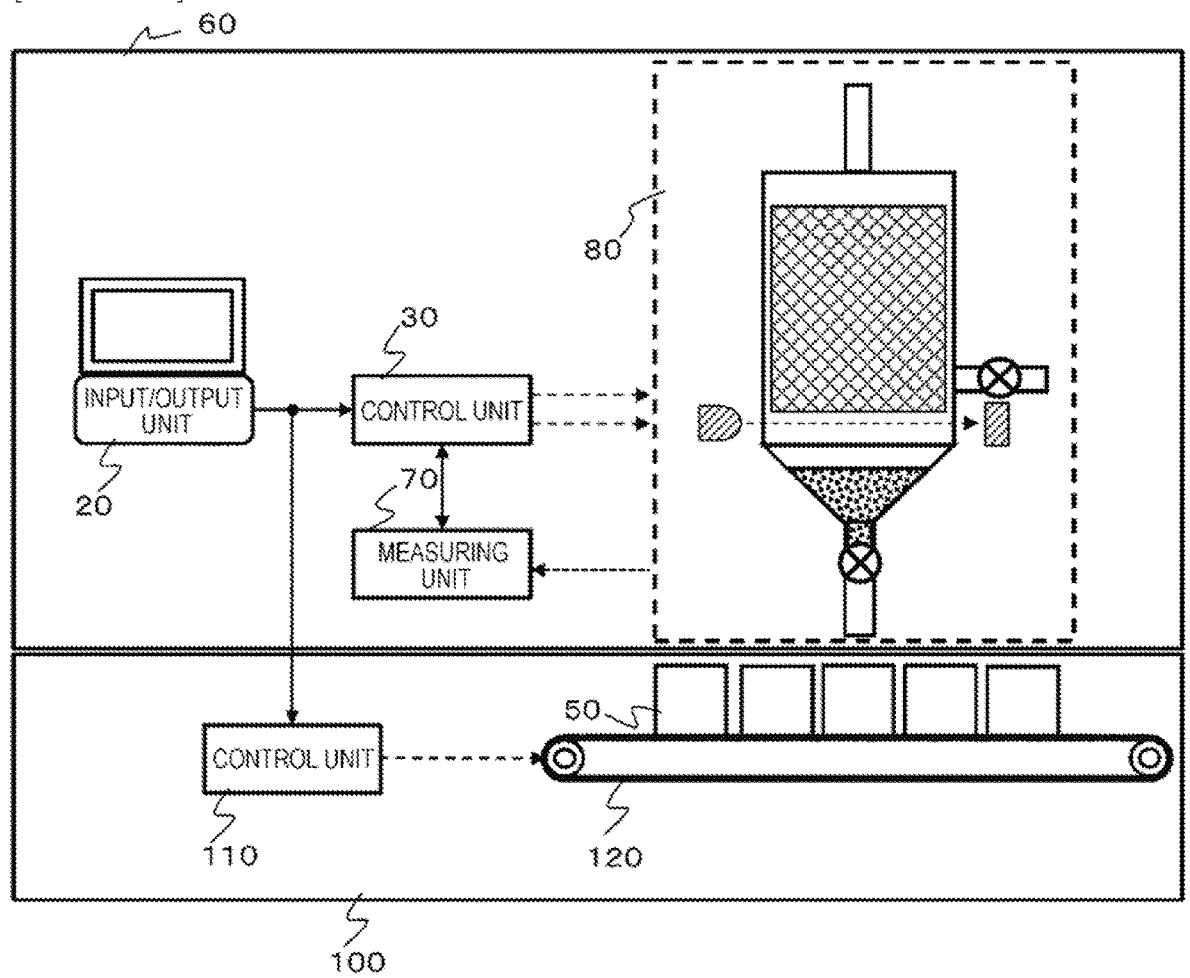

[FIG. 12]
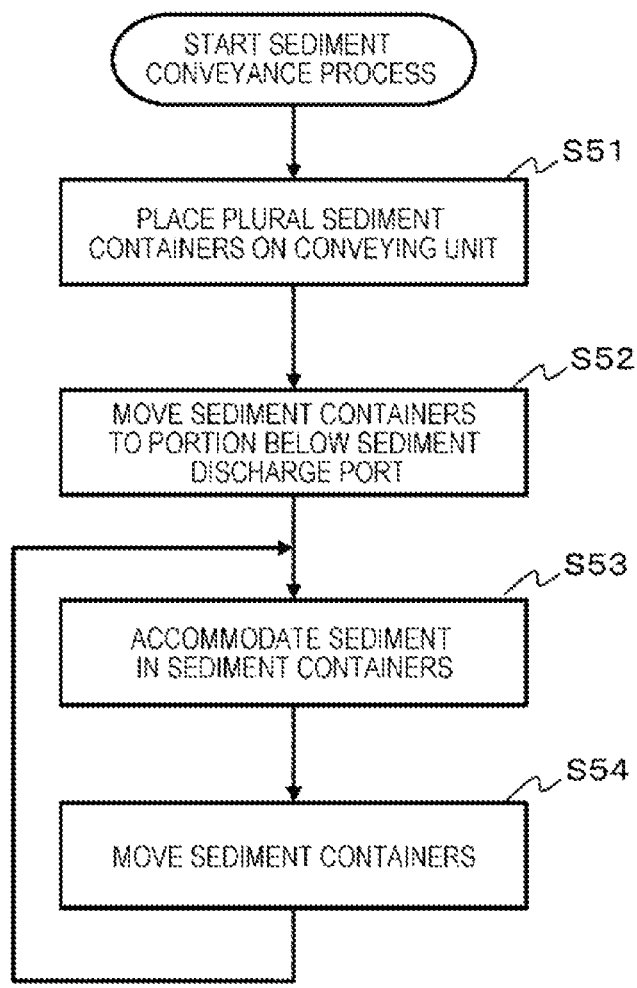

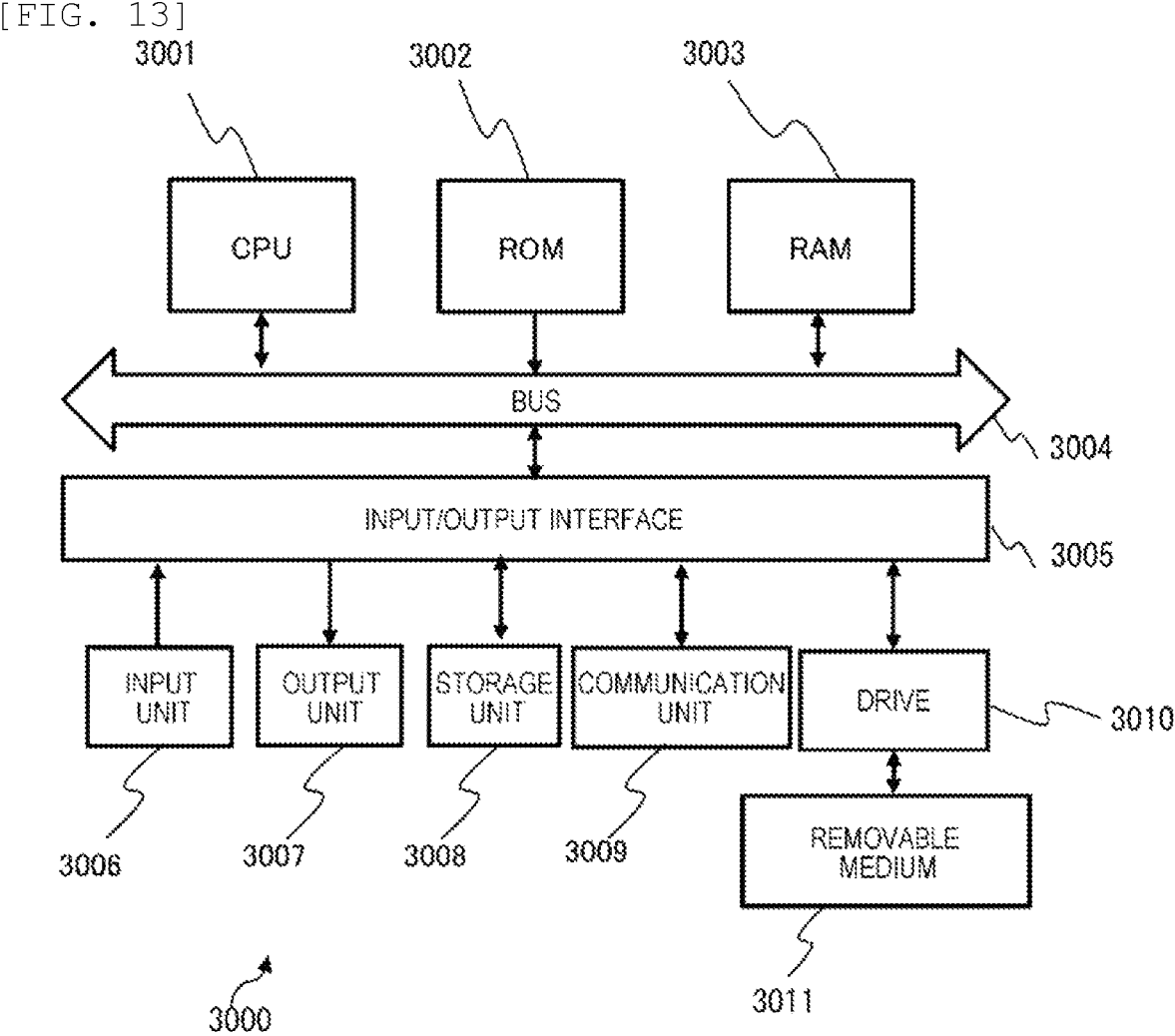

TURBID MATTER SEPARATING APPARATUS, TURBID MATTER SEPARATING METHOD, AND TURBID MATTER SEPARATING SYSTEM

TECHNICAL FIELD

The present invention relates to a turbid matter separating apparatus, a turbid matter separating method, and a turbid matter separating system.

BACKGROUND ART

In the related art, a method of separating turbid matter by adding a flocculant to a suspension containing turbid matter, aggregating the turbid matter, and then spontaneously sedimenting or centrifuging the turbid matter has been known. There is also a method of aggregating turbid matter using ultrasound to separate the turbid matter. For example, PTL 1 discloses "an emulsion separating device for separating an emulsion containing oil components and aqueous components, which includes an emulsion supply portion through which the emulsion is supplied, an emulsion discharge portion which discharges the separated emulsion, and a flow path portion which is connected to the emulsion supply portion, in which the emulsion supply portion and the emulsion discharge portion are connected via a first piping unit and a second piping unit, and the piping units are constituted of an ultrasonic transducer element and an ultrasonic reflecting member arranged so as to be opposed to each other with the flow path portion interposed therebetween".

CITATION LIST

Patent Literature

PTL 1: WO 2016/042832 (A1)

SUMMARY OF INVENTION

Technical Problem

In an emulsion separating apparatus described in PTL 1, it is not provided with a structure for discharging turbid matter (sediment) separated from an emulsion, so that it is difficult to extract the turbid matter and a supernatant liquid separately. Also, the turbidity of the emulsion is not measured, and thus a separation process for separating the turbid matter cannot be controlled at an appropriate time.

The invention is made in view of such circumstances, and the object thereof is to extract turbid matter and a supernatant liquid separately from a suspension.

Solution to Problem

The application includes a plurality of means for solving at least a part of the problem described above. Examples thereof are as follows. In order to solve the problems described above, a turbid matter separating apparatus according to an aspect of the invention includes a liquid container which includes a sediment discharge port and a supernatant liquid discharge port and is filled with a suspension containing turbid matter, a sediment valve which is provided in the sediment discharge port, a supernatant liquid valve which is provided in the supernatant liquid discharge port, an ultrasonic irradiator which irradiates the suspension filled in the liquid container with ultrasound, and a control unit which controls the sediment valve, a supernatant liquid valve, and the ultrasonic irradiator, in which the control unit controls the sediment valve to discharge sediment and controls the supernatant liquid valve to discharge a supernatant liquid after a predetermined time elapses since the irradiation with ultrasound by the ultrasonic irradiator is stopped.

Advantageous Effects of Invention

According to the invention, it is possible to extract turbid matter and a supernatant liquid separately from the suspension.

Problems, configurations, and effects other than those described above will be clarified from the description of the embodiments described below.

BRIEF DESCRIPTION OF DRAWINGS

FIG. 1 is a view illustrating a configuration example of a turbid matter separating apparatus according to a First embodiment of the invention.

FIGS. 2A and 2B are views illustrating a configuration example of a turbid matter separating unit of the turbid matter separating apparatus according to the first embodiment of the invention, in which FIG. 2A is aside view and FIG. 2B is a top view.

FIG. 3 is a diagram for explaining the effect of ultrasonic irradiation.

FIG. 4 is a flowchart for explaining an example of a turbid matter separation process by the turbid matter separating apparatus according to the first embodiment of the invention.

FIG. 5 is a view illustrating a configuration example of a turbid matter separating apparatus according to a second embodiment of the invention.

FIGS. 6A and 6B are views illustrating a configuration example of a turbid matter separating unit of the turbid matter separating apparatus according to the second embodiment of the invention, in which FIG. 6A is a side view and FIG. 6B is a top view.

FIG. 7 is a flowchart for explaining an example of a turbid matter separation process by the turbid matter separating apparatus according to the second embodiment of the invention.

FIG. 8 is a cross-sectional view illustrating a configuration example of a turbid matter separating unit of a turbid matter separating apparatus according to a third embodiment of the invention.

FIG. 9 is a flowchart for explaining an example of a turbid matter separation process by the turbid matter separating apparatus according to the third embodiment of the invention.

FIG. 10 is a flowchart for explaining an example of the turbid matter separation process by the turbid matter separating apparatus according to the third embodiment of the invention.

FIG. 11 is a view illustrating a configuration example of a turbid matter separation system according to a fourth embodiment of the invention.

FIG. 12 is a flowchart for explaining an example of a sediment conveyance process by the turbid matter separation system according to the fourth embodiment of the invention.

FIG. 13 is a block diagram illustrating a configuration example of a computer.

DESCRIPTION OF EMBODIMENTS

Hereinafter, a plurality of embodiments according to the invention will be described with reference to the drawings. In all the drawings for explaining the embodiments, the same members are denoted by the same reference numerals in principle, and the repetitive description thereof will be omitted. Further, in each embodiment described below, the constituent elements (including element steps and the like) that are not necessarily indispensable will not be mentioned except for a case where it is explicitly stated and a case where it is considered to be obviously indispensable in principle. Also, when "comprising A", "consisting of A", "having A", or "including A" is referred, the fact that other elements are not excluded will not be mentioned except for a case where it is clearly stated that it is the only element in particular. Similarly, in the following embodiments, when the shape, the positional relationship, or the like of constituent elements or the like is referred, those substantially approximate or similar to the shape or the like are included except for a case where it is specified explicitly and a case where it is considered obviously unlikely in principle.

In addition, in the description of the configuration of each embodiment, an orthogonal coordinate system having X, Y, and Z axes is used for understanding. X and Y are directions forming a horizontal plane and Z is a vertical direction. Of course, even when the configuration of each embodiment does not strictly coincide with the XYZ axes, it is permissible to change within a range which can achieve substantially the same operational effect.

Configuration Example of Turbid Matter Separating Apparatus According to First Embodiment of Invention FIG. 1 illustrates a configuration example of a turbid matter separating apparatus according to a first embodiment of the invention.

A turbid matter separating apparatus 10 includes an input/output unit 20, a control unit 30, and a turbid matter separating unit 40.

The input/output unit 20 functions as a user interface, accepts various commands, for example, such as a start command input from a user to output to the control unit 30. The control unit 30 controls the turbid matter separating unit 40 according to various commands from the input/output unit 20. Specifically, the control unit 30 output ultrasound by an ultrasonic transducer 48 of the turbid matter separating unit 40, and opens or closes valves such as a supernatant liquid valve 44. The input/output unit 20 and the control unit 30 may be integrated.

FIGS. 2A and 2B illustrate a detailed configuration example of the turbid matter separating unit 40. FIG. 2A is a side view of a ZY plane, and FIG. 2B is a top view of an XY plane.

The turbid matter separating unit 40 includes a liquid container 41 filled with a liquid (hereinafter, referred to as a suspension) containing turbid matter such as solid fine particles and oil droplets, the ultrasonic transducer 48, and an ultrasonic reflection plate 49. The ultrasonic transducer 48 and the ultrasonic reflection plate 49 (corresponding to the ultrasonic irradiator of the invention) are installed in parallel to opposite sides on the liquid container 41.

The ultrasonic transducer 48 is connected to the control unit 30 and irradiates the ultrasonic reflection plate 49 with ultrasound according to the control from the control unit 30. The ultrasonic reflection plate 49 reflects the ultrasound output from the ultrasonic transducer 48 toward the ultrasonic transducer 48. During the period of the ultrasonic irradiation, a stationary wave of ultrasound is generated in the suspension filled between the ultrasonic transducer 48, and the ultrasonic reflection plate 49 and turbid matter is aggregated on the node and the antinode.

When the irradiation with ultrasound stops, the aggregated turbid matter subsides by gravity and is piled as sediment 47 at the bottom of the liquid container 41. Also, as the turbid matter subsides, a supernatant liquid is formed in the middle portion of the liquid container 41.

The ultrasonic transducer 48 is divided into a plurality of pieces and distributed, and the irradiation order, the frequency and the phase of the ultrasound are controlled according to the arrangement of the divided ultrasonic transducers 48. In such a manner, the turbid matter in the suspension may be transferred to accelerate condensation and sedimentation.

On an upper surface of the liquid container 41, a supply portion 42 is provided for flowing the suspension according to the control from the control unit 30. The position of the supply portion 42 is not limited to the upper surface of the liquid container 41 and may be, for example, the upper side of the side surface of the liquid container 41. Further, a plurality of supply portions 42 may be provided. Furthermore, the supply portion 42 may be provided with a pump or the like for flowing the suspension into the liquid container 41.

In the supply portion 42, in addition to the suspension, a flocculant for aggregating the turbid matter contained in the suspension can be added. Also, a dedicated supply portion (not illustrated) for adding the flocculant may be provided. As the flocculant, inorganic flocculants such as common polyaluminum chloride (PAC), polymer flocculants, organic flocculants having ion exchange reaction, and the like can be used.

A supernatant liquid discharge port 43 for discharging the supernatant liquid and the supernatant liquid valve 44 for regulating the discharge of the supernatant liquid from the supernatant liquid discharge port 43 are provided in the middle of the side surface of the liquid container 41. The supernatant liquid valve 44 is connected to the control unit 30, and open and closed according to the control from the control unit 30. The number of supernatant liquid discharge ports 43 is not limited to 1, and a plurality of supernatant liquid discharge ports 43 may be provided. Further, in the vicinity of the supernatant liquid discharge port 43, a pump or the like for discharging the supernatant liquid may be provided.

At the bottom of the liquid container 41, a sediment discharge port 45 for discharging the sediment 47 consisting of the aggregated and precipitated turbid matter, and a sediment valve 46 for regulating discharge of the sediment 47 from the sediment discharge port 45 are provided. The sediment valve 46 is connected to the control unit 30, and open and closed according to the control from the control unit 30. The number of sediment discharge ports 45 is not limited to 1, and a plurality of sediment discharge ports 45 may be provided. Further, in the vicinity of the sediment discharge port 45, a pump or the like for discharging the sediment 47 may be provided.

Under the sediment discharge port 45, a sediment container 50 for accommodating the sediment 47 is installed. The sediment container 50 can accommodate the sediment 47 discharged from the sediment discharge port 45 by opening the sediment valve 46 under the control of the control unit 30. The sediment container 50 is provided with a lid 51, and the lid 51 can be closed after the sediment 47 is accommodated.

The liquid container 41 may be provided with a liquid level sensor, a liquid weighing scale, a stirring device or a circulation device. Further, the liquid container 41 may be attached with a thermostat, or provided with an electric heater, or a pipe where steam or a coolant or the like is passed so as to control the temperature.

Effect of Ultrasonic Irradiation

Next, FIG. 3 is a diagram illustrating a verification result that transparency increases (turbidity decreases) by irradiating the suspension with ultrasound. In the drawing, a horizontal axis represents an elapsed irradiation time of ultrasound, and a vertical axis represents intensity (transparency of the suspension) of the laser light transmitted through the suspension.

For the test, a substance, in which alumina particles (turbid matter) with a particle size of 4 µm to 15 µm are dispersed in water at a concentration of 1 g/L, is used as a suspension. A rectangular liquid container made of acrylic resin is used, and an ultrasonic transducer with a natural frequency of 2 MHz and an ultrasonic reflection plate were installed in parallel to each other on the opposite surfaces of the liquid container. In addition, a He—Ne laser beam device with a wavelength of 633 nm is used for a light emitting portion for measuring the transparency of the suspension and a photodiode sensor is used for a light receiving portion.

When the suspension is irradiated with ultrasound, turbid matter is aggregated on the antinode and the node of the stationary wave, and the volume thereof is increased, thereby making the sedimentation easy to subside. Therefore, the clarification of the suspension progresses and the laser transmission light intensity increases (transparency increases). As illustrated in the drawing, in a case of ultrasonic irradiation, the time until the suspension became transparent to the same degree of transparency of a case without ultrasonic irradiation (spontaneous sedimentation) is shortened to about 1/40. Therefore, acceleration of the sedimentation of the turbid matter by irradiating the suspension with ultrasound can be confirmed.

Turbid Matter Separation Process by Turbid Matter Separating Apparatus 10

Next, FIG. 4 is a flowchart for explaining an example of a turbid matter separation process by the turbid matter separating apparatus 10.

The turbid matter separation process starts, for example, when a start command is input from a user to the input/output unit 20.

First, according to the control from the control unit 30, the supply portion 42 fills the liquid container 41 with the suspension (Step S1). Next, according to the control from the control unit 30, the supply portion 42 adds a flocculant to the liquid container 41 (Step S2). Further, the process of Step S2 may be omitted.

Next, the ultrasonic transducer 48 irradiates the ultrasonic reflection plate 49 with ultrasound output by the control unit 30 for a predetermined period (Step S3). The output ultrasound is reflected by the ultrasonic reflection plate 49. As a result, a stationary wave of ultrasound is generated in the suspension, thereby aggregating turbid matter on the node or the antinode.

Next, the control unit 30 stops the output of ultrasound and stands by for a predetermined period (Step S4). During the stand-by period, the aggregated turbid matter subsides by gravity, and is piled at the bottom of the liquid container 41. Also, as the turbid matter subsides, a supernatant liquid will be formed in the middle portion of the liquid container 41.

Next, the control unit 30 opens the sediment valve 46 for a predetermined period and to discharge the sediment 47 accumulated at the bottom of the liquid container 41 from the sediment discharge port 45 to the sediment container 50 (Step S5).

Next, the control unit 30 opens the supernatant liquid valve 44 for a predetermined period to discharge the supernatant liquid generated in the middle portion of the liquid container 41 from the supernatant liquid discharge port 43 (Step S6). In this way, the turbid matter separation process by the turbid matter separating apparatus 10 is finished.

The period of the irradiation with ultrasound in Step S3, the stand-by period after the irradiation with ultrasound stops in Step S4, the period of discharging the sediment 47 in Step S5, and the period of discharging the supernatant liquid in Step S6 may be decided based on the actual results of a test executed in advance or a turbid matter separation process executed in the past.

Further, the order of the process of discharging the sediment 47 in Step S5 and the process of discharging the supernatant liquid in Step S6 may be switched.

According to the turbid matter separation process by the turbid matter separating apparatus 10 described above, it is possible to shorten the time required to separate the suspension into the sediment 47 and the supernatant liquid when compared with the method of the related art. Also, it is not necessary to store the suspension for a long time, and therefore the capacity of the liquid container 41 can be reduced.

Configuration Example of Turbid Matter Separating Apparatus According to Second Embodiment of Invention Next, FIG. 5 illustrates a configuration example of a turbid matter separating apparatus according to a second embodiment of the invention. Constituent elements common to a turbid matter separating apparatus 60 of the second embodiment and the turbid matter separating apparatus 10 (FIG. 1) of the first embodiment are denoted by the same reference numerals, and the description thereof will be omitted as appropriate.

The turbid matter separating apparatus 60 includes the input/output unit 20, the control unit 30, a measuring unit 70, and a turbid matter separating unit 80.

The control unit 30 controls the turbid matter separating unit 80 according to various commands from the input/output unit 20. In addition, the control unit 30 outputs the ultrasound output from the built-in ultrasonic oscillator (not illustrated) to the turbid matter separating unit 80.

The measuring unit 70 measures the turbidity based on the received light intensity of a light beam transmitted through the suspension filled in the liquid container 41 of the turbid matter separating unit 80 according to the control from the control unit 30, and outputs the measurement result to the control unit 30. The input/output unit 20, the control unit 30, and the measuring unit 70 may be integrated.

Next, FIGS. 6A and 6B illustrate a detailed configuration example of the turbid matter separating unit 80, in which FIG. 6A is a side view of a ZY plane and FIG. 6B is a top view of an XY plane.

The turbid matter separating unit 80 is obtained by adding a pair of a light emitting portion 81 and a light receiving portion 83 to the turbid matter separating unit 40 (FIG. 2). The measuring unit 70 and the pair of the light emitting portion 81 and the light receiving portion 83 correspond to a transmitted light intensity measuring unit of the invention.

The pair of the light emitting portion 81 and the light receiving portion 83 is located directly below the supernatant liquid discharge port 43, and is disposed in parallel on the opposite sides of the liquid container 41. In a case of FIG. 5, the pair of the ultrasonic transducer 48 and the ultrasonic reflection plate 49 is installed on an YZ plane of the liquid container 41 and the pair of the light emitting portion 81 and the light receiving portion 83 is installed on an XZ plane of the liquid container 41. The pair of the ultrasonic transducer 48 and the ultrasonic reflection plate 49 and the pair of the light emitting portion 81 and the light receiving portion 83 may be installed on the same opposite sides of the liquid container 41.

The light emitting portion 81 is connected to the measuring unit 70 and outputs a light beam 82 to the light receiving portion 83 installed on the opposite surfaces of the liquid container 41 according to the control from the measuring unit 70. The light receiving portion 83 is connected to the measuring unit 70, receives the light beam 82 output from the light emitting portion 81, measures the received light intensity, and notifies the measuring unit 70 of the received light intensity. Since the light beam 82 output from the light emitting portion 81 reaches the light receiving portion 83 through the suspension filled in the liquid container 41, when the turbidity of the suspension is high, the light beam 82 is scattered by the turbid material. Therefore, the intensity of the light received by the light receiving portion 83 is reduced. In this way, the measuring unit 70 can measure the turbidity of the suspension corresponding to the received light intensity notified from the light receiving portion 83.

Turbid Matter Separation Process by Turbid Matter Separating Apparatus 60

Next, FIG. 7 is a flowchart for explaining an example of the turbid matter separation process by the turbid matter separating apparatus 60.

The turbid matter separation process starts, for example, when a start command is input from a user to the input/output unit 20.

First, according to the control from the control unit 30, the supply portion 42 fills the suspension into the liquid container 41 (Step S11). Next, according to the control from the control unit 30, the supply portion 42 adds a flocculant to the liquid container 41 (Step S12). Further, the process of Step S12 may be omitted.

Next, the control unit 30 starts the output of ultrasound. Therefore, the ultrasonic transducer 48 starts to irradiate the ultrasonic reflection plate 49 with the ultrasound (Step S13). The output ultrasound is reflected by the ultrasonic reflection plate 49. As a result, a stationary wave of the ultrasound is generated in the suspension, thereby aggregating turbid matter on the node or the antinode.

Next, the light emitting portion 81 starts the output of the light beam 82 according to the control from the measuring unit 70. On the other hand, the light receiving portion 83 starts notification of the received light intensity of the light beam 82 and, based on the notification, the measuring unit 70 starts to measure the turbidity of the suspension directly below the supernatant liquid discharge port 43 and notifies the measured turbidity to the control unit 30 (Step S14).

Next, the control unit 30 determines whether the turbidity of the suspension is equal to or less than a predetermined threshold value (Step S15). Here, when the control unit 30 determines that the turbidity of the suspension is not equal to or less than the predetermined threshold value (NO in Step S15), the output of the ultrasound is continued until the turbidity of the suspension becomes equal to or less than the predetermined threshold value. Then, when the aggregation of the turbid matter progresses by the irradiation with ultrasound so that the control unit 30 determines that the turbidity of the suspension is equal to or less than the predetermined threshold value (YES in Step S15), the output of the ultrasound stops and the system stands by for a predetermined period (Step S16). During the stand-by period, the aggregated turbid matter subsides by gravity, and is piled at the bottom of the liquid container 41. Also, as the turbid matter subsides, a supernatant liquid will be formed in the middle portion of the liquid container 41.

Next, the control unit 30 opens the sediment valve 46 for a predetermined period to discharge the sediment 47 accumulated at the bottom of the liquid container 41 from the sediment discharge port 45 to the sediment container 50 (Step S17).

Next, the control unit 30 opens the supernatant liquid valve 44 for a predetermined period to discharge the supernatant liquid generated in the middle of the liquid container 41 from the supernatant liquid discharge port 43 (Step S18). When the discharge of the supernatant liquid is finished and the surface of the suspension lowers, the turbidity to be measured is changed. Thus, closing of the supernatant liquid valve 44 may be performed depending on the change in the turbidity measured using the pair of the light emitting portion 81 and the light receiving portion 83 regardless of the time. When the turbidity increases due to some reasons while the supernatant liquid is discharged, the control unit 30 may close the supernatant liquid valve 44 so that the turbid matter is precipitated again. In this way, the turbid matter separation process by the turbid matter separating apparatus 60 is finished.

The stand-by period after the irradiation with ultrasound stops in Step S16, the period of discharging the sediment 47 in Step S17, and the period of discharging the supernatant liquid in Step S18 may be decided based on the actual results of a test executed in advance or turbid matter separation process executed in the past.

Further, the order of the process of discharging the sediment 47 in Step S17 and the process of discharging the supernatant liquid in Step S18 may be switched.

The flocculant maybe added not prior to the irradiation with ultrasound but when the turbidity does not become equal to or lower than the threshold value even after a predetermined time is elapsed since the irradiation with ultrasound. In this case, the additive may be added while continuing the ultrasonic irradiation or the irradiation with ultrasound may be temporarily stopped to add the additive, and then the irradiation with ultrasound may be resumed.

According to the turbid matter separation process by the turbid matter separating apparatus 60 described above, it is possible to shorten the time required to separate the suspension into the sediment 47 and the supernatant liquid when compared with the method of the related art. Also, since it is not necessary to store the suspension in the liquid container 41 for a long time, the capacity of the liquid container 41 can be reduced. Furthermore, the turbid matter separation process can be efficiently performed by quantitatively managing the turbidity.

In the turbid matter separating apparatus 60, the turbidity of the suspension is measured using a laser beam, but it is also possible to measure the turbidity of the suspension using ultrasound. In this case, reflected waves of the ultrasound are measured by the ultrasonic transducer 48 and the turbidity of the suspension is measured based on the change of the ultrasound by the scatterer (turbid matter) in the suspension. An ultrasonic sensor (not illustrated) is additionally disposed at the position of the ultrasonic reflection plate 49 and the ultrasound from the ultrasonic transducer 48 is measured. In such a manner, the turbidity of the suspension is measured based on the change of the ultrasound by the scatterer (turbid matter) in the suspension. Alternatively, instead of utilizing the ultrasonic transducer 48 or the ultrasonic reflection plate 49, a dedicated ultrasonic transducer and a dedicated ultrasonic reflection plate for measuring the turbidity of the suspension may be installed.

Configuration Example of Turbid Matter Separating Unit of Turbid Matter Separating Apparatus According to Third Embodiment of Invention Next, a turbid matter separating apparatus according a third embodiment of the invention will be described. The turbid matter separating apparatus according to the third embodiment of the invention replaces the turbid matter separating unit 80 of the turbid matter separating apparatus 60 (FIG. 5) according to the second embodiment with a turbid matter separating unit 90.

FIG. 8 is a side view of a ZY plane illustrating a configuration example of the turbid matter separating unit 90. Constituent elements common to the turbid matter separating unit 80 (FIG. 6) are denoted by the same reference numerals, and the description thereof will be omitted as appropriate.

In the turbid matter separating unit 90, corresponding to the turbid matter separating unit 80, a floating material discharge port 91 for discharging floating materials (oil or the like having a light specific gravity) and a floating material valve 92 for regulating discharge of the floating materials from the floating material discharge port 91 are added to an upper portion of the side surface of the liquid container 41. The floating material valve 92 is connected to the control unit 30, and opens and closes according to the control from the control unit 30. The number of floating material discharge ports 91 is not limited to 1, and a plurality of floating material discharge ports 91 may be provided. Further, in the vicinity of the floating material discharge port 91, a pump or the like for discharging the floating material may be provided.

Further, in the turbid matter separating unit 90, corresponding to the turbid matter separating unit 80, a pair of a light emitting portion 93 and a light receiving portion 95 and a pair of a light emitting portion 96 and a light receiving portion 98 are added.

The pair of the light emitting portion 93 and the light receiving portion 95 are installed directly below the floating material discharge port 91 to be opposite to each other. The pair of the light emitting portion 96 and the light receiving portion 98 are installed directly above the sediment valve 46 to be opposite to each other.

The light emitting portion 93 is connected to the measuring unit 70 and outputs a light beam 94 toward the light receiving portion 95 through the suspension according to the control from the measuring unit 70. The light receiving portion 95 is connected to the measuring unit 70, receives the light beam 94 output from the light emitting portion 93, and measures the received light intensity to notify to the measuring unit 70. For example, when floating materials pass between the light emitting portion 93 and the light receiving portion 95, the received light intensity of the light beam 94 received by the light receiving portion 95 temporarily decreases due to the floating material and recovers after the floating materials pass therethrough. Therefore, the measuring unit 70 can determine the presence or absence of floating materials according to the change in the received light intensity notified from the light receiving portion 95.

The light emitting portion 96 is connected to the measuring unit 70 and outputs a light beam 97 toward the light receiving portion 98 through the suspension according to the control from the measuring unit 70. The light receiving portion 98 is connected to the measuring unit 70, receives the light beam 97 output from the light emitting portion 96, and measures the received light intensity to notify to the measuring unit 70. For example, when the sediment 47 is piled between the light emitting portion 96 and the light receiving portion 98, the received light intensity of the light beam 97 received by the light receiving portion 98 becomes substantially zero. Therefore, the measuring unit 70 can determine the presence or absence of the sediment 47 according to the change in the received light intensity notified from the light receiving portion 98.

In the turbid matter separating unit 90, three pairs of the light emitting portion and light receiving portion are provided. However, two pairs or four or more pairs of the light emitting portion and the light receiving portion may be provided at different heights.

Turbid Matter Separation Process by Turbid Matter Separating Apparatus According to Third Embodiment of Invention FIG. 9 is a flowchart for explaining an example of a turbid matter separation process by the turbid matter separating apparatus according to the third embodiment of the invention.

The turbid matter separation process starts, for example, when a start command is input from a user to the input/output unit 20.

First, according to the control from the control unit 30, the supply portion 42 fills the suspension into the liquid container 41 (Step S21). Next, according to the control from the control unit 30, the supply portion 42 adds a flocculant to the liquid container 41 (Step S22). Further, the process of Step S22 may be omitted.

Next, the control unit 30 starts the output of ultrasound. Therefore, the ultrasonic transducer 48 starts to irradiate the ultrasonic reflection plate 49 with the ultrasound (Step S23). The output ultrasound is reflected by the ultrasonic reflection plate 49. As a result, a stationary wave of ultrasound is generated in the suspension, thereby aggregating turbid matter on the node or the antinode.

Next, the light emitting portion 81 starts the output of the light beam 82 according to the control from the measuring unit 70. On the other hand, the light receiving portion 83 starts notification of the received light intensity of the light beam 82 and, based on the notification, the measuring unit 70 starts to measure the turbidity of the suspension directly below the supernatant liquid discharge port 43 and notifies the measured turbidity to the control unit 30 (Step S24).

Next, the control unit 30 determines whether the turbidity of the suspension directly below the supernatant liquid discharge port 43 is equal to or less than a predetermined threshold value (Step S25). Here, when the control unit 30 determines that the turbidity of the suspension is not equal to or less than the predetermined threshold value (NO in Step S25), the process returns to Step S24 and the irradiation with ultrasound and the determination as to whether the turbidity of the suspension is equal to or less than the predetermined threshold value are repeated. Then, when the aggregation of the turbid matter progresses by the irradiation with ultrasound so that the control unit 30 determines that the turbidity of the suspension is equal to or less than the predetermined threshold value (YES in Step S25), the output of the ultrasound stops and the system stands by for a predetermined period (Step S26). During the stand-by period, the aggregated turbid matter subsides by gravity, and is piled at the bottom of the liquid container 41. Also, as the turbid matter subsides, a supernatant liquid will be formed in the middle portion of the liquid container 41.

In addition, during the stand-by period, the light emitting portion 93 disposed directly below the floating material discharge port 91 starts the output of the light beam 94 according to the control from the measuring unit 70, and the light receiving portion 95 starts notification of the received light intensity of the light beam 94.

Next, the measuring unit 70 determines whether the floating materials float based on the change in the received light intensity sequentially notified from the light receiving portion 95 (Step S27). Here, when it is determined that the floating materials are not floated (NO in Step S27), the determination is repeated until it is determined that the floating materials float. Then, when it is determined that the floating materials float (YES in Step S27), the measuring unit 70 notifies the fact to the control unit 30, and then the control unit 30 opens the floating material valve 92 for a predetermined period and discharges the floating materials floating in the upper portion of the liquid container 41 from the floating material discharge port 91 (Step S28).

Next, the control unit 30 opens the sediment valve 46 and starts the discharge of the sediment 47 accumulated at the bottom of the liquid container 41 from the sediment discharge port 45 to the sediment container 50 (Step S29). Next, the light emitting portion 96 provided directly above the sediment discharge port 45 outputs the light beam 97 according to the control from the measuring unit 70 and the light receiving portion 98 notifies the received light intensity of the light beam 97, and then, based on the notification, the measuring unit 70 measures the turbidity of the suspension directly above the sediment discharge port 45 and notifies the control unit 30 of the measurement result (Step S30).

Next, the control unit 30 determines whether the turbidity of the suspension directly above the sediment discharge port 45 is equal to or less than a predetermined threshold (Step S31). Here, when the control unit 30 determines that the turbidity of the suspension is not equal to or less than the predetermined threshold (NO in Step S31), the process returns to Step S30 and the processes in Steps S30 and S31 is repeated. Then, when the control unit 30 determines that the turbidity of the suspension is equal to or less than the predetermined threshold value (YES in Step S31), it can be regarded that discharge of the piled sediment 47 is finished, and therefore, the sediment valve 46 is closed (Step S32).

Next, the control unit 30 opens the supernatant liquid valve 44 for a predetermined period and discharges the supernatant liquid generated in the middle portion of the liquid container 41 from the supernatant liquid discharge port 43 (Step S33).

When the discharge of the supernatant is finished and the surface of the suspension lowers, the turbidity to be measured is changed. Thus, closing of the supernatant liquid valve 44 may be performed depending on the change in the turbidity measured using the pair of the light emitting portion 81 and the light receiving portion 83 regardless of the time. When the turbidity increases due to some reasons while the supernatant liquid is discharged, the control unit 30 may close the supernatant liquid valve 44 so that the turbid matter is precipitated again. In this way, the turbid matter separation process by the turbid matter separating apparatus according to the third embodiment of the invention is finished.

The stand-by period after the irradiation with ultrasound stops in Step S26, the period of discharging the floating materials in Step S28, and the period of discharging the supernatant liquid in Step S33 may be decided based on the actual results of a test executed in advance or turbid matter separation process executed in the past.

Further, the order of the process of discharging the sediment 47 in Steps S29 to S32 and the process of discharging the supernatant liquid in Step S34 may be switched.

The flocculant maybe added not prior to the irradiation with ultrasound but when the turbidity does not become equal to or lower than the threshold value even after a predetermined time is elapsed since the irradiation with ultrasound. In this case, the additive may be added while continuing the ultrasonic irradiation or the irradiation with ultrasound may be temporarily stopped to add the additive, and then the irradiation with ultrasound may be resumed.

According to the turbid matter separation process by the turbid matter separating apparatus according to the third embodiment of the invention described above, when the suspension contains oil or the like having a light specific gravity, it is possible to separate the suspension into the floating materials such as oil, the supernatant liquid, and the sediment 47, and to shorten the time required for separation. Further, since it is not necessary to store the suspension in the liquid container 41 for a long time, the capacity of the liquid container 41 can be reduced. Furthermore, the turbid matter separation process can be efficiently performed by quantitatively managing the turbidity.

For measuring the turbidity of the suspension, it is also possible to use ultrasound instead of a laser beam. In this case, reflected waves of the ultrasound are measured by the ultrasonic transducer 48 and the turbidity of the suspension is measured based on the change of the ultrasound by the scatterer (turbid matter) in the suspension. An ultrasonic sensor (not illustrated) is additionally disposed at the position of the ultrasonic reflection plate 49 and the ultrasound from the ultrasonic transducer 48 is measured. In such a manner, the turbidity of the suspension is measured based on the change of the ultrasound by the scatterer (turbid matter) in the suspension. Alternatively, instead of utilizing the ultrasonic transducer 48 or the ultrasonic reflection plate 49, a dedicated ultrasonic transducer and a dedicated ultrasonic reflection plate for measuring the turbidity of the suspension may be installed.

Turbid Matter Separating System According to
Fourth Embodiment of Invention

Next, FIG. 11 illustrates a configuration example of a turbid matter separating system according to a fourth embodiment of the invention. The turbid matter separating system is obtained by adding a conveying device 100 to the turbid matter separating apparatus 60 (FIG. 5) according to Embodiment 2 of the invention.

The conveying device 100 accommodates the sediment 47 discharged from the turbid matter separating unit 80 of the turbid matter separating apparatus 60 in the sediment container 50 and sequentially transports the sediment container 50. The conveying device 100 includes a control unit 110 and a conveying unit 120.

The control unit 110 controls the conveying unit 120 in synchronization with the control of the turbid matter separating unit 80 by the control unit 30. The conveying unit 120 consists of, for example, a belt conveyor. The conveying unit 120 sequentially moves placed plural sediment containers 50 to the portion below the sediment discharge port 45 of the turbid matter separating unit 80, stops moving for a period when the sediment 47 is accommodated in the sediment container 50, and then moves again. In such a manner, the sediment containers 50 accommodating the sediment 47 are sequentially conveyed.

In addition to the belt conveyor, the conveying unit 120 may be configured by a roller, a basket, a cart, a disk-shaped rotating table, or the like. In addition, the conveying unit 120 may have not a shape where the placed sediment containers 50 are moved but a shape where the suspended or held sediment containers 50 are moved.

Although not illustrated in FIG. 11, the lid 51 (FIG. 6) is provided in the sediment container 50 so that the lid 51 is automatically open and closed in response to the accommodation of the sediment 47 to the sediment container 50. Also, there may be a gap between the sediment container 50 and the sediment discharge port 45, but preferably, the sediment container 50 is in close contact with the sediment discharge port 45 without a gap. Also, preferably, the sediment container 50 and the sediment discharge port 45 can be easily attached and detached.

The sediment container 50 may be provided with a pipe with a valve instead of the lid 51 so that the sediment 47 from the sediment discharge port 45 is accommodated via the pipe.

Further, the turbid matter separating system may be configured by adding the conveying device 100 to the turbid matter separating apparatus according to the first or third r embodiment of the invention.

Sediment Conveyance Process by Turbid Matter Separating System

Next, FIG. 12 is a flowchart for explaining an example of a sediment conveyance process by the turbid matter separating system.

Further, in the turbid matter separating unit 80 of the turbid matter separating apparatus 60 included in the turbid matter separating system, it is assumed that turbid matter is already separated from the suspension and the sediment 47 is piled at the bottom of the liquid container 41, and therefore, processes of the conveying device 100 will mainly be described in the following.

First, the control unit 110 places a plurality of empty sediment containers 50 on the conveying unit 120 at predetermined intervals using a robot or the like (not illustrated) (Step S51). Next, according to the control from the control unit 110, the conveying unit 120 moves one empty sediment container 50 to the portion below the sediment discharge port 45 of the turbid matter separating unit 80 (Step S52)

Next, the control unit 30 of the turbid matter separating apparatus 60 opens the sediment valve 46 of the turbid matter separating unit 80 for a predetermined time to discharge the sediment 47 accumulated at the bottom of the liquid container 41 from the sediment discharge port 45 and to accommodate the sediment 47 in the sediment container 50 (Step S53).

Next, according to the control from the control unit 110, the conveying unit 120 moves the sediment container 50 accommodating the sediment 47 by the process of Step S53 to a subsequent stage (Step S54). Therefore, one empty sediment container 50 is moved to the portion below the sediment discharge port 45 of the turbid matter separating unit 80. Thereafter, the process returns to Step S53, and Steps S53 and S54 are repeated until the entire sediment 47 accumulated at the bottom of the liquid container 41 is discharged. So far, the explanation of the sediment conveyance process by the turbid matter separating system is finished.

According to the above-described sediment conveyance process by the turbid matter separating system, it is possible to smoothly convey the sediment 47 separated from the suspension in a state where the sediment 47 is accommodated in the sediment container 50.

In each embodiment described above, the discharge destination of the supernatant liquid is not mentioned, but similarly to the sediment 47, the supernatant liquid may be accommodated in a dedicated container and conveyed. In similar ways, the floating materials may be accommodated in a dedicated container and conveyed.

The input/output unit 20, the control unit 30, the measuring unit 70, and the control unit 110 in each embodiment described above can be configured by hardware or realized by software. When the control unit 30 or the like is realized by software, a program constituting the software is installed in a computer. Here, the computer includes a computer incorporated in dedicated hardware, and, for example, a general-purpose personal computer or the like capable of executing various functions by installing various programs.

FIG. 15 is a block diagram illustrating a configuration example of hardware of a computer which realizes the control unit 30 and the like by a program.

In a computer 3000, a Central Processing Unit (CPU) 3001, a Read Only Memory (ROM) 3002, and a Random Access Memory (RAM) 3003 are mutually connected by a bus 3004.

Further, an input/output interface 3005 is connected to the bus 3004. An input unit 3006, an output unit 3007, a storage unit 3008, a communication unit 3009, and a drive 3010 are connected to the input/output interface 3005.

The input unit 3006 is constituted of a keyboard, a mouse, a microphone, or the like. The output unit 3007 is constituted of a display, a speaker, or the like. The storage unit 3008 is constituted of a Hard Disc Drive (HDD), a Solid State Drive (SSD), or the like and stores various kinds of information. The communication unit 3009 is constituted of a LAN interface or the like and communicates with other devices via a network. A drive 3010 drives a removable medium 3011 such as a magnetic disk, an optical disk, a magneto-optical disk, a semiconductor memory, or the like.

In the computer 3000 configured as described above, the CPU 3001, for example, loads a program stored in the storage unit 3008 into the RAM 3003 via the input/output interface 3005 and the bus 3004 and executes the program, thereby realizing that the control unit 30 and the like.

A program to be executed by the computer 3000 (the CPU 3001) can be recorded on, for example, the removable medium 3011 as a package or the like and provided. Further, the program can be provided via a wired or wireless transmission medium such as a local area network, a communication network, digital satellite broadcasting, or the like.

In the computer 3000, the program can be installed in the storage unit 3008 via the input/output interface 3005 by mounting the removable medium 3011 on the drive 3010. In addition, the program can be received by the communication unit 3009 via a wired or wireless transmission medium and installed in the storage unit 3008. In addition, the program can be installed in the ROM 3002 or the storage unit 3008 in advance.

The program executed by the computer 3000 may be a program in which processes are performed in chronological order according to the order described in the specification or a program in which processes are performed in parallel or at a necessary time such as when a call is made.

The effects described in the specification are merely examples and are not limited and other effects may be achieved.

The invention is not limited to the embodiments described above and includes various modification examples. For example, each embodiment described above is described in detail in order to explain the present invention in an easy-to-understand manner and the invention is not necessarily limited to one having all the constituent elements described above. In addition, a part of the configuration of one embodiment can be replaced by the configuration of another embodiment, and the configuration of another embodiment can be added to the configuration of one embodiment. Further, it is possible to add, remove, or replace other configurations with respect to a part of the configuration of each embodiment.

REFERENCE SIGNS LIST

10: turbid matter separating apparatus
20: input/output unit
30: control unit
40: turbid matter separating unit
41: liquid container
42: supply portion
43: supernatant liquid discharge port
44: supernatant liquid valve
45: sediment discharge port
46: sediment valve
47: sediment
48: ultrasonic transducer
49: ultrasonic reflection plate
50: sediment container
51: lid
60: turbid matter separating apparatus
70: measuring unit
80: turbid matter separating unit
81: light emitting portion
82: light beam
83: light receiving portion
90: turbid matter separating unit
91: floating material discharge port
92: floating material valve
93: light emitting portion
94: light beam
95: light receiving portion
96: light emitting portion
97: light beam
98: light receiving portion
100: conveying device
110: control unit
120: conveying unit
3000: computer
3001: CPU
3002: ROM
3003: RAM
3004: BUS
3005: input/output interface
3006: input unit
3007: output unit
3008: storage unit
3009: communication unit
3010: drive
3011: removable medium

The invention claimed is:

1. A turbid matter separating method of using a turbid matter separating apparatus which includes a liquid container which includes a sediment discharge port and a supernatant liquid discharge port and is filled with a suspension containing turbid matter, a sediment valve which is provided in the sediment discharge port, a supernatant liquid valve which is provided in the supernatant liquid discharge port, and an ultrasonic irradiator which irradiates the suspension filled in the liquid container with ultrasound, the method comprising steps of:
   filling the liquid container with the suspension;
   irradiating the suspension with ultrasound by the ultrasonic irradiator for a predetermined time, wherein, during the irradiation, a stationary wave of ultrasound is generated in the suspension and the turbid matter contained in the suspension is aggregated; and
   discharging sediment by controlling the sediment valve and discharging a supernatant liquid by controlling the supernatant liquid valve after a predetermined time elapses since the irradiation with ultrasound by the ultrasonic irradiator is stopped.

2. A turbid matter separating system including a turbid matter separating apparatus and a conveying device,
   the turbid matter separating apparatus including:
   a liquid container which includes a sediment discharge port and a supernatant liquid discharge port and is filled with a suspension containing turbid matter;
   a sediment valve which is provided in the sediment discharge port;
   a supernatant liquid valve which is provided in the supernatant liquid discharge port;
   an ultrasonic irradiator which irradiates the suspension filled in the liquid container with ultrasound, wherein, during the irradiation, a stationary wave of ultrasound is generated in the suspension and the turbid matter contained in the suspension is aggregated; and
   a control unit which controls the sediment valve, the supernatant liquid valve, and the ultrasonic irradiator,
   the control unit being configured to control the sediment valve to discharge sediment and controls the supernatant liquid valve to discharge a supernatant liquid after a predetermined time elapses since the irradiation with ultrasound by the ultrasonic irradiator is stopped, and
   the conveying device being configured to accommodate the sediment discharged from the sediment discharge port in a sediment container and to sequentially transport one or more sediment containers.

3. A turbid matter separating apparatus, comprising:
   a liquid container which includes a sediment discharge port and is filled with a suspension containing turbid matter;

a sediment valve which is provided in the sediment discharge port;

an ultrasonic irradiator which irradiates the suspension filled in the liquid container with ultrasound, wherein, during the irradiation, a stationary wave of ultrasound is generated in the suspension and the turbid matter contained in the suspension is aggregated; and a control unit which controls the sediment valve and the ultrasonic irradiator, the control unit being configured to control the sediment valve to discharge sediment after a predetermined time elapses since the irradiation with ultrasound by the ultrasonic irradiator is stopped.

4. The turbid matter separating apparatus according to claim 3, wherein the liquid container includes a supernatant liquid discharge port, the turbid matter separating apparatus further includes a supernatant liquid valve provided in the supernatant liquid discharge port, and the control unit controls the supernatant liquid valve to discharge a supernatant liquid after a predetermined time elapses since the irradiation with ultrasound by the ultrasonic irradiator is stopped.

5. A turbid matter separating method of using a turbid matter separating apparatus which includes a liquid container which includes a sediment discharge port and is filled with a suspension containing turbid matter, a sediment valve which is provided in the sediment discharge port, and an ultrasonic irradiator which irradiates the suspension filled in the liquid container with ultrasound, the method comprising steps of:

filling the liquid container with the suspension;

irradiating the suspension with ultrasound by the ultrasonic irradiator for a predetermined time, wherein, during the irradiation, a stationary wave of ultrasound is generated in the suspension and the turbid matter contained in the suspension is aggregated; and discharging sediment by controlling the sediment valve after a predetermined time elapses since the irradiation with ultrasound by the ultrasonic irradiator is stopped.

6. A turbid matter separating system including a turbid matter separating apparatus and a conveying device, the turbid matter separating apparatus including:

a liquid container which includes a sediment discharge port and is filled with a suspension containing turbid matter;

a sediment valve which is provided in the sediment discharge port;

an ultrasonic irradiator which irradiates the suspension filled in the liquid container with ultrasound, wherein, during the irradiation, a stationary wave of ultrasound is generated in the suspension and the turbid matter contained in the suspension is aggregated; and a control unit which controls the sediment valve and the ultrasonic irradiator, the control unit being configured to control the sediment valve to discharge sediment after a predetermined time elapses since the irradiation with ultrasound by the ultrasonic irradiator is stopped, and the conveying device being configured to accommodate the sediment discharged from the sediment discharge port in a sediment container and to sequentially transport one or more sediment containers.

7. A turbid matter separating apparatus comprising:

a liquid container which includes a sediment discharge port and is filled with a suspension containing turbid matter;

a supernatant liquid valve which is provided in the supernatant liquid discharge port;

an ultrasonic irradiator which irradiates the suspension filled in the liquid container with ultrasound, wherein, during the irradiation, a stationary wave of ultrasound is generated in the suspension and the turbid matter contained in the suspension is aggregated; and a control unit which controls the supernatant liquid valve and the ultrasonic irradiator, the control unit being configured to control the supernatant liquid valve to discharge a supernatant liquid after a predetermined time elapses since the irradiation with ultrasound by the ultrasonic irradiator is stopped.

8. The turbid matter separating apparatus according to claim 7, wherein the liquid container includes a sediment discharge port, the turbid matter separating apparatus further includes a sediment valve provided in the sediment discharge port, and the control unit controls the sediment valve to discharge sediment after a predetermined time elapses since the irradiation with ultrasound by the ultrasonic irradiator is stopped.

9. A turbid matter separating method of using a turbid matter separating apparatus which includes a liquid container which includes a supernatant liquid discharge port and is filled with a suspension containing turbid matter, a supernatant liquid valve which is provided in the supernatant liquid discharge port, and an ultrasonic irradiator which irradiates the suspension filled in the liquid container with ultrasound, the method comprising steps of:

filling the liquid container with the suspension;

irradiating the suspension with ultrasound by the ultrasonic irradiator for a predetermined time, wherein, during the irradiation, a stationary wave of ultrasound is generated in the suspension and the turbid matter contained in the suspension is aggregated; and discharging a supernatant liquid by controlling the supernatant liquid valve after a predetermined time elapses since the irradiation with ultrasound by the ultrasonic irradiator is stopped.

10. A turbid matter separating system including a turbid matter separating apparatus and a conveying device, the turbid matter separating apparatus including a liquid container which includes a supernatant liquid discharge port and is filled with a suspension containing turbid matter;

a supernatant liquid valve which is provided in the supernatant liquid discharge port;

an ultrasonic irradiator which irradiates the suspension filled in the liquid container with ultrasound, wherein, during the irradiation, a stationary wave of ultrasound is generated in the suspension and the turbid matter contained in the suspension is aggregated; and a control unit which controls the supernatant liquid valve and the ultrasonic irradiator, the control unit being configured to control the supernatant liquid valve to discharge a supernatant liquid after a predetermined time elapses since emission of the ultrasound by the ultrasonic irradiator is stopped, and the conveying device being configured to accommodate the supernatant liquid discharged from the supernatant liquid discharge port in a supernatant liquid container and to sequentially transport one or more supernatant liquid containers.

11. A non-transitory computer readable medium storing a program, that when executed by a computer, causes the computer to perform the turbid matter separating method according to claim 1.

\* \* \* \* \*